Dec. 10, 1929. J. L. MORRIS ET AL 1,738,840
ROTATING SIGN DISPLAY DEVICE
Filed April 19, 1928 3 Sheets-Sheet 1

Inventors
J. L. Morris and
B. E. Mitchell
By Jacobi & Jacobi
Attorneys

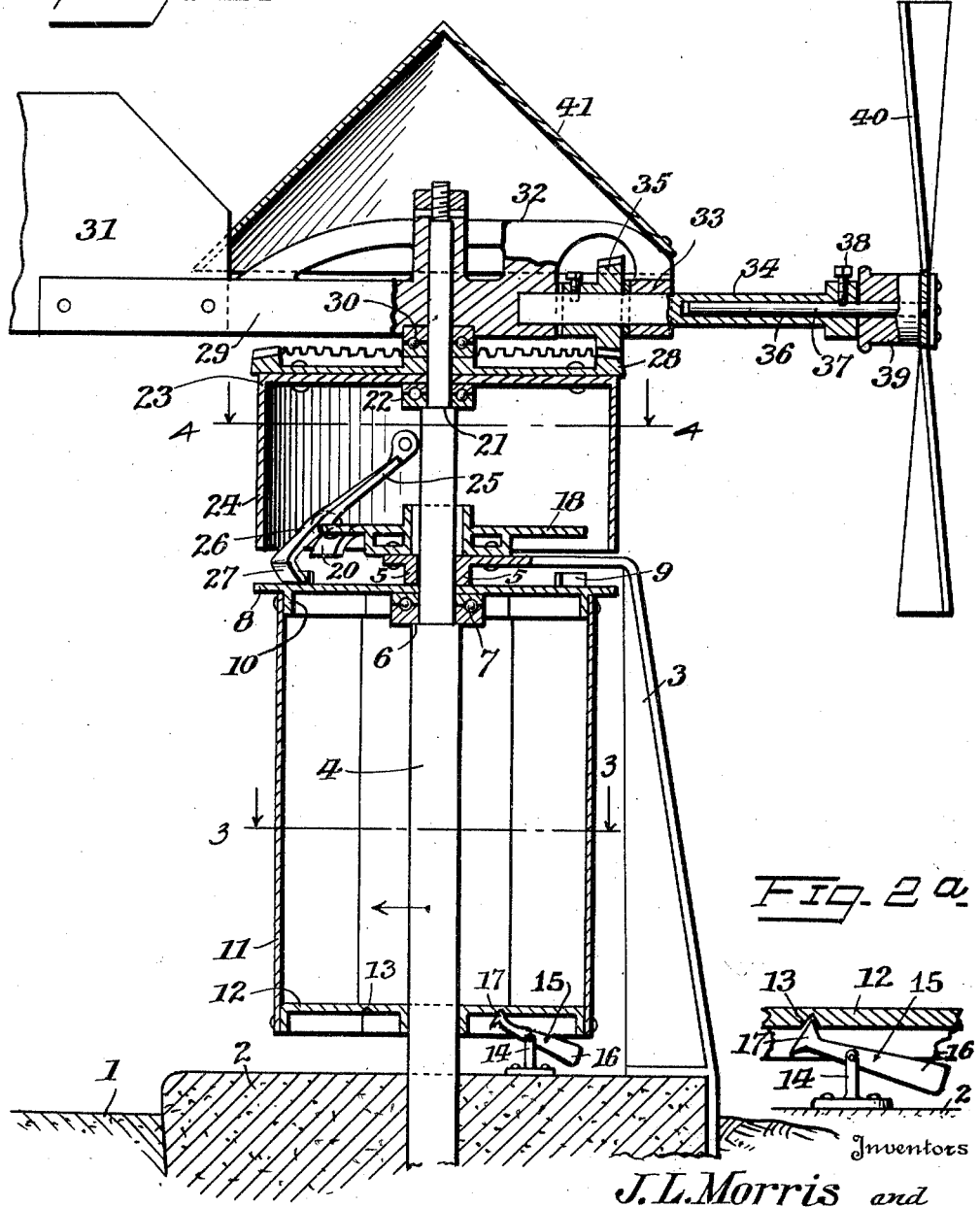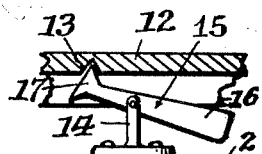

Dec. 10, 1929.　　J. L. MORRIS ET AL　　1,738,840
ROTATING SIGN DISPLAY DEVICE
Filed April 19, 1928　　3 Sheets-Sheet 3
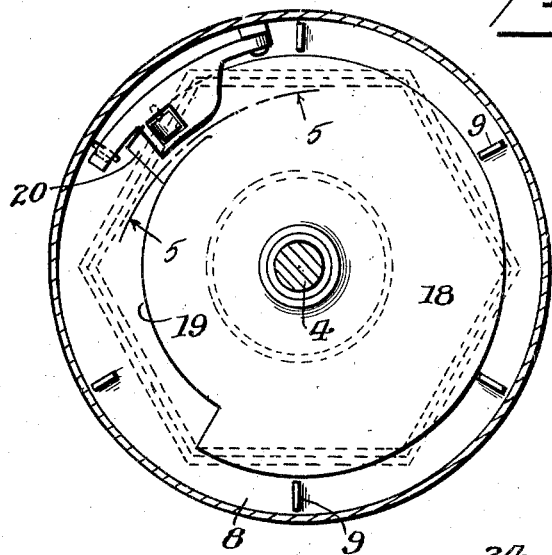
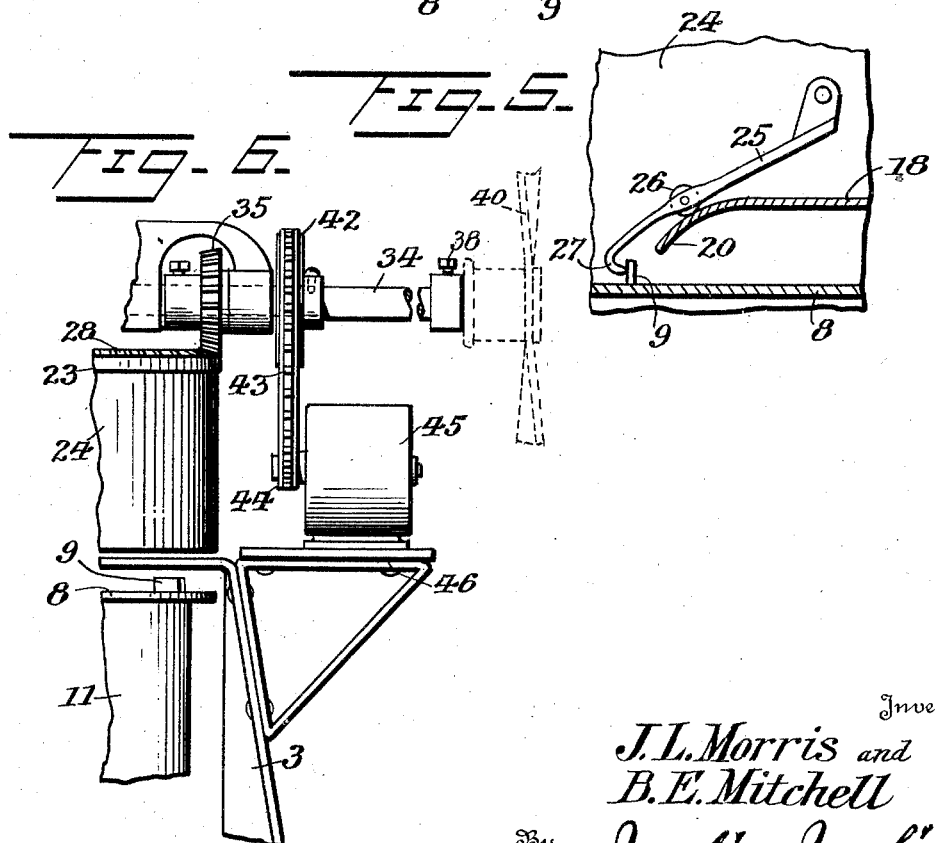
Inventors
J. L. Morris and
B. E. Mitchell
By Jacobi & Jacobi
Attorneys Patented Dec. 10, 1929

1,738,840

UNITED STATES PATENT OFFICE

JOHN L. MORRIS AND BERNARD E. MITCHELL, OF WOODSDALE, NORTH CAROLINA

ROTATING SIGN-DISPLAY DEVICE

Application filed April 19, 1928. Serial No. 271,247.

This invention relates to a rotating sign display device and it consists in the novel features hereinafter described and claimed.

An object of the invention is to provide a device of the character stated including a rotatable member or members having exterior faces or surfaces upon which different signs may be mounted and means for rotating the said members by stages or at intervals so that the respective signs may be brought to points or positions whereby they may be observed and read by those who may be passing over a road adjacent to which the device is placed.

A further object of the invention is to provide means for holding the said members at fixed positions at intervals so that the sign or signs which are exposed as hereinbefore stated remain at rest for a length of time in order that the signs may be observed and read while they are stationary.

A further object of the invention is to provide means for preventing the members from rotating or turning in a direction opposite to that in which it is intended that they should turn and whereby the series of signs are caused to turn about the axis or shaft which supports the device in one direction only and whereby the said signs are prevented from moving or reciprocating back and forth in the paths upon which they travel during the rotation of the members.

With the foregoing and other objects in view which will appear as the description progresses, the invention resides in the combination and arrangement of parts and the detailed construction hereinafter described and claimed, it being understood that changes in the precise embodiment of the invention herein disclosed, may be made within the scope of what is claimed without departing from the spirit of the invention.

In the accompanying drawings:

Figure 2 is an enlarged vertical sectional view of the form of the device as shown in Figure 1.

Figure 2ᵃ is a fragmentary detailed sectional view of the lower portion of the device.

Figure 1:
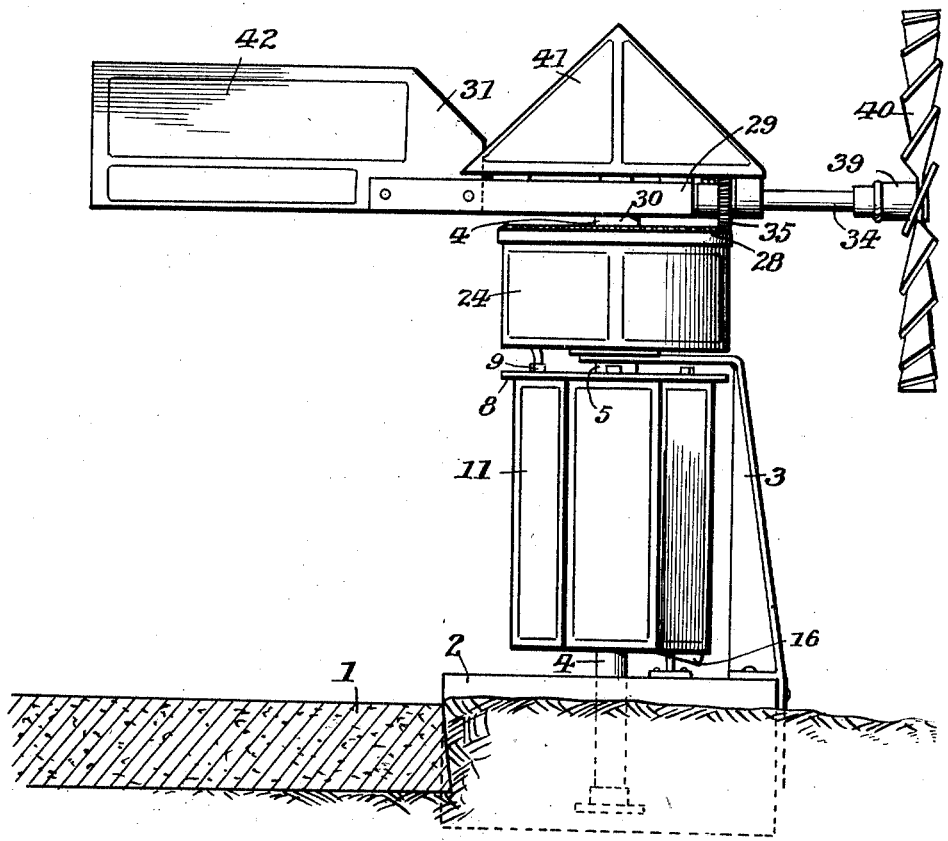
Figure 1 is a side elevational view of one form of the rotating sign display device, illustrating the same as being adapted to be operated by a wind-wheel.
Figure 3:
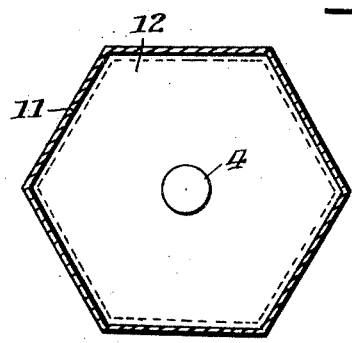

Figure 3 is a horizontal sectional view of the lower portion of the device, cut on the line 3—3 of Figure 2.

Figure 4 is a horizontal sectional view of the upper portion of the device, cut on the line 4—4 of Figure 2.

Figure 5 is a fragmentary detailed side elevational view of the upper portion of the device, with parts thereof shown in section.

Figure 6 is a fragmentary side elevational view of a modified form of the device, with a motor for operating the same.

As illustrated in the accompanying drawing, the device is located adjacent a roadway which is indicated at 1. The supporting base 2 is located adjacent the side of the roadway and a standard 3 is supported upon the said base. A shaft 4 is supported in a vertical position upon the base 2 and the upper portion thereof passes through a bearing 5 provided at the upper end of the standard 3.

The shaft 4 is provided at its intermediate portion with a shoulder 6 upon which the lower race of an anti-friction bearing 7 rests. The upper race of the said anti-friction bearing is attached to a head plate 8 which is journalled upon the shaft 4. The said head plate is provided at its upper side and at spaced intervals with upstanding lugs 9. The plate 8 is provided at its under side with a depending flange 10. The upper surface of the plate 8 bears against the lower edge of the bearing 5 provided at the upper end of the standard 3.

A series of panels 11 depend from the flange 10 and are connected at their lower ends with a bottom plate 12 which is journalled upon the lower portion of the shaft 4. The panels 11 are arranged at angles with relation to each other and abut each other at their edges and the panels may be six or eight in number or any other suitable number of panels may be employed as desired. The panels and the said plate form a cylinder which is mounted upon the shaft and which is adapted to be turned or rotated as will be hereinafter explained.

The bottom plate 12 is provided at its under side with a series of spaced notches 13. A stud 14 is mounted upon the base 2 and an arm 15 is pivoted to the upper end of the said stud. The arm 15 is weighted at one end as at 16 whereby the said end of the said arm is made heavier than the opposite end portion thereof. The lighter end portion of the said arm is provided with an upstanding finger 17 which is adapted to enter the notches 13 respectively, as the cylinder rotates, the heavy end 16 causing the said finger to enter the notches.

By reason of this arrangement, the cylinder is held against reverse rotating movement and is also held stationary at intervals so that the sign or signs which are at the exposed position remain at a state of rest for an interval of time and the said sign or signs may be easily observed and read.

A disk 18 is mounted upon the upper end of the standard 3 and is provided at one side with a recess 19. The material of the disk at one end of the said recess is bent downwardly as at 20, forming a skid upon which the roller of a catch member hereinafter described is adapted to travel.

The shaft 4 is provided at its upper portion with a second shoulder 21 upon which rests the casing of an anti-friction bearing 22. A drum 23 rests at its center upon the said anti-friction bearing 22 and the said drum 23 is provided with a skirt portion 24 which is disposed around the edges of the plate 18 and spaced therefrom. A catch member 25 is pivoted at one end to the inner surface of the skirt member 24 and a roller 26 is journalled at the intermediate portion of the said catch member. The roller 26 is adapted to travel around the peripheral portion of the disk 18 and may also drop through the recess 19 of the disk when the said recess comes under the said roller. The roller 26 may pass up along the skid portion 20 of the disk so that the roller may travel upon the upper surface of the disk beyond the ends of the recess 19. The catch member 25 is provided at its lower end with a hook 27 which is so disposed as to engage the lugs 9 at one side thereof successively. Should the catch member move in a backward direction or the direction other than that in which it is intended that it should move, the hook 27 rides over the upper edge of any one of the lugs 9 with which it may come in contact.

An annular gear rack 28 is mounted at the upper end of the drum 23 and is concentrically arranged around the shaft 4. A beam 29 is mounted at the upper end of the shaft 4 and disposed transversely thereof and an anti-friction bearing 30 is interposed between the under side of the beam and the top of the drum 23. A vane 31 is carried at one end of the beam 29 and a brace 32 is mounted at the intermediate portion of the said beam.

The beam 29 may rotate freely upon the shaft 4 and is provided at one end with a socket 33 which receives one end of a spindle 34. The spindle 34 is journalled for free rotation in the beam 29 and a gear wheel 35 is fixed to the spindle 34 and the teeth thereof mesh with the teeth of the rack 28. The spindle 34 is provided with a socket 36 which receives the stub shaft 37. The shaft 37 is fixed to the spindle 34 by means of a set screw 38. A head 39 is mounted upon the stub shaft 37 beyond the end of the spindle 34. A wind wheel 40 is mounted upon the head 39 and the blades thereof radiate from the said head and the axis of the shaft 37. The blades of the wheel 40 are helically disposed with relation to the axis of the shaft 37 whereby the surfaces of the blade are disposed in suitable planes so that the wheel is caused to rotate when subjected to the blast of air coming from a direction transversely of the axis of the wheel. The vane 31 serves to hold the beam and the wheel in the line of draft of the blast of air, in the usual manner. A hood 41 is mounted upon the brace 32 and is disposed over the upper end of the shaft 4 and the drum 23.

The vane 31 is provided with spaces 42 upon which suitable advertising matter may be placed, the drum 24 is provided with spaces upon which advertising matter may be placed and signs or advertising matter may be placed upon the panels 11.

In the form of the invention as shown in Figure 6 of the drawings, a sprocket wheel 42 is mounted upon the spindle 34 and a sprocket chain 43 is trained around the said sprocket wheel and also a sprocket wheel 44 mounted upon the shaft of the motor 45 which in turn is mounted upon a bracket 46 attached to the upper portion of the standard 3.

In the arrangement as shown in Figures 1 to 5, inclusive, the vane 31 holds the wheel 40 presented toward the direction from which the wind is coming in the usual manner of a wind-wheel. The wind impinges upon the blades of the wheel 40 and causes the stub shaft 37, the spindle 34 and the gear wheel 35 mounted thereon, to rotate. Inasmuch as the teeth of the gear wheel 35 mesh with the teeth of the gear rack 28 and as the said gear rack is mounted upon the drum 23, the said drum is rotated about the axis of the shaft 4 and the catch member 25 is carried around the peripheral portion of the disk 18. During such time as the roller 26 which is mounted upon the catch member 25 is travelling upon the edge portion of the disk 18, the free end or hook 27 of the catch member 25 is held at an elevated position. When the drum 23 turns so that the free end or hook 27 of the catch member 25 is over the recess 19 at the periphery of the disk 18, the free end of the said catch falls or drops whereby the hook 27 comes in contact with the upper surface of the head plate 8. As the drum 23 continues to rotate, the edge of the hook 27 comes in contact with the side surface of one of the lugs 9 and consequently, the plate 8 is turned and all of the parts which are carried by the plate are correspondingly moved. Thus, the signs which are carried upon the panels 11 are turned and one of them is presented toward roadway 1 and may be readily observed by those who are using the roadway and the general traffic thereover. When the drum 23 continues to turn or rotate, the wheel 26 upon the catch member 25 rides upon the skid 20 of the disk 18 and the free end of the catch member 25 is lifted so that the hook 27 is carried above the upper edge of that lug 9 with which it has been in engagement and the plate 8 and the parts attached thereto are permitted to remain at a state of rest while the said drum continues in its rotary movement under the influence of the gear wheel 35 and the wind-wheel which is operatively connected thereto as hereinbefore described. When the plate 8 and the parts connected thereto cease to rotate, the finger 17 upon the arm 15 enters one of the notches 13 in the bottom plate 12 and consequently, the panels 11 which are attached to the plates 8 and 12 are temporarily held at fixed position so that the particular sign upon that panel which is presented toward the roadway is held stationary until such time as the drum 23 has been rotated to bring the catch member 25 over the recess in the disk 18, and when this has been done, the operation hereinbefore described is repeated. The arm 15 has its active end or the finger 17 held up against the under surface of the plate 12 under the influence of the weighted end 16 of the said arm. When the plate 12 is turned it may move over the finger 17 but when the said finger is in engagement with one of the notches 13, it serves to hold the plate temporarily in fixed position.

Thus, the signs which are carried upon the panels 11 are moved intermittently or by stages and at intervening intervals remain at a state of rest. Therefore, those signs which are disposed toward the roadway are visible to the traffic and may be clearly discerned during such intervals of rest. The signs which are carried upon the spaces of the drum 23 rotate around the axis of the said drum and consequently, the said signs, inasmuch as they are constantly in a state of movement, attract attention and may be observed by the traffic upon the roadway. The signs which are carried by the vane 31 and the hood 41 vacillate back and forth under the influence of the wind which is playing upon the wheel 40 and, therefore, the said signs, being in movement, attract the attention of the traffic.

In the form of the arrangement as shown in Figure 6 of the drawing, wind is not relied upon for turning the shaft 37, but in lieu thereof, the said shaft 37 is rotated from the shaft of the motor 45 by the connecting sprocket chain and sprocket wheel. As the stub shaft 37 is rotated by the motor, the drum 23 is rotated and the panels 11 which are carried by the cylinder of which the plates 8 and 12 are component parts, are turned by stages, as hereinbefore described, and the signs which are mounted upon the panels are brought to view and held at a state of rest, as hereinbefore stated.

From the foregoing description in conjunction with the accompanying drawings, it will be seen that a rotating sign display device of simple and durable structure is provided, and that the same may be effectually and efficiently used for displaying advertising matter.

Inasmuch as the panels of the cylinder may be of any number desired, these panels may be so arranged that the cylinder has the general shape of a hexagon, square or triangle or any other polylateral figure.

The operation of our improved device may be readily understood from the foregoing description, and it will be seen that we have provided a simple, inexpensive and efficient means for carrying out the objects of the invention.

While we have particularly described the elements best adapted to perform the functions set forth, it is obvious that various changes in form, proportion and in the minor details of construction may be resorted to without departing from the spirit or sacrificing any of the principles of the invention.

Having described the invention, what is claimed is:

1. A sign display device comprising a shaft, a cylinder journaled for rotation thereon, means mounted on said shaft and engaging one end of the cylinder for rotating said cylinder, means for rotating the cylinder by stages, and means engaging the other end of said cylinder for holding the latter at rest during the intervals between the stages of rotation.

2. A sign display device comprising a cylinder journaled for rotation, means engaging the upper end of the cylinder for rotating the cylinder by stages and a weight actuated friction means engageable with the lower end of the cylinder for holding the cylinder at rest during the intervals between the stages of rotation.

3. A sign display device comprising a vertically disposed shaft, a cylinder journaled thereon, friction means for holding the cylinder at rest at intervals, a drum journaled above the cylinder, means for rotating the drum, said cylinder having at its upper end a series of spaced lugs, a disk plate mounted above the cylinder and a catch member pivoted to the drum and having an end portion adapted to engage the lugs at intervals and adapted between intervals to ride over the disk member and pass above the lugs.

4. A sign display device comprising a shaft, a cylinder journaled thereon, means for holding the cylinder at rest at intervals, a series of spaced lugs carried by the cylinder, a disk plate located upon the shaft above the cylinder and provided at its edge with a recess, a drum journaled above the cylinder, means for rotating the drum and a catch member carried by the drum and adapted to travel upon the disk plate and pass through the recess thereof and engage the lugs of the cylinder.

5. A sign display device comprising a shaft, a cylinder journaled thereon, means for holding the cylinder at rest at intervals, signs carried by the cylinder, a disk plate located above the cylinder and having a recess, a drum journaled above the cylinder, a catch member carried by the drum and adapted to ride upon the disk plate, said cylinder having lugs adapted to be engaged by the catch member, a beam journaled upon the shaft, a wheel journaled upon the beam and engaging the drum and means for rotating said wheel.

In testimony whereof we affix our signatures.

JOHN L. MORRIS.
BERNARD E. MITCHELL.